United States Patent
Kumar et al.

(10) Patent No.: US 10,549,372 B2
(45) Date of Patent: Feb. 4, 2020

(54) BRAZING COMPOSITIONS FOR DUCTILE BRAZE STRUCTURES, AND RELATED PROCESSES AND DEVICES

(71) Applicant: General Electric Company, Schenectady, NY (US)

(72) Inventors: Sundeep Kumar, Bangalore (IN); Raghavendra Rao Adharapurapu, Bangalore (IN)

(73) Assignee: General Electric Company, Schenectady, NY (US)

( * ) Notice: Subject to any disclaimer, the term of this patent is extended or adjusted under 35 U.S.C. 154(b) by 394 days.

(21) Appl. No.: 15/474,273

(22) Filed: Mar. 30, 2017

(65) Prior Publication Data

US 2017/0282272 A1  Oct. 5, 2017

(30) Foreign Application Priority Data

Mar. 30, 2016 (IN) .............................. 201641010952

(51) Int. Cl.
| | |
|---|---|
| *C22C 45/04* | (2006.01) |
| *B23K 1/19* | (2006.01) |
| *B23K 35/30* | (2006.01) |
| *B23K 101/00* | (2006.01) |
| *B23K 101/38* | (2006.01) |
| *B23K 103/18* | (2006.01) |

(52) U.S. Cl.
CPC .............. *B23K 1/19* (2013.01); *B23K 35/304* (2013.01); *C22C 45/04* (2013.01); *B23K 2101/001* (2018.08); *B23K 2101/002* (2018.08); *B23K 2101/38* (2018.08); *B23K 2103/18* (2018.08)

(58) Field of Classification Search
CPC ......... C22C 45/04; C22C 19/03; C22C 19/07; B23K 1/19; B23K 35/304
See application file for complete search history.

(56) References Cited

U.S. PATENT DOCUMENTS

| | | |
|---|---|---|
| 4,414,178 A | 11/1983 | Smith, Jr. et al. |
| 5,040,718 A | 8/1991 | Lee et al. |
| 7,651,023 B2 | 1/2010 | Huang et al. |
| 2013/0224561 A1 | 8/2013 | Adharapurapu et al. |
| 2013/0315659 A1 | 11/2013 | Kumar et al. |
| 2013/0316226 A1 | 11/2013 | Adharapurapu et al. |
| 2014/0069988 A1 | 3/2014 | Kumar et al. |
| 2014/0295258 A1 | 10/2014 | Kumar et al. |
| 2014/0356681 A1 | 12/2014 | Kumar et al. |

OTHER PUBLICATIONS

Hattali et al., "Study of SiC—nickel alloy bonding for high temperature applications", Journal of the European Ceramic Society, Journal of the European Ceramic Society, vol. 29, Issue 4, pp. 813-819, (Mar. 2009).

Hirane, T. et al., "Liquid Phase Diffusion Bonding of a Nickel-base Oxide Dispersion Strengthened Alloy MA 754," Tetsu-to-Hagane: The Iron and Steel Institute of Japan, vol. 72, Issue 10, pp. 1590-1597, (Aug. 1986) (Synopsis).

Walker, C.A. and Hodges, V.C., "Comparing metal-ceramic brazing methods," Brazing and Soldering Today, Welding Journal, International Brazing & Soldering Symposium, pp. 43-50, (Oct. 2008).

Zhang et al., "Joining strength and interfacial microstructure of brazing superalloy and 3D-Cf/SiC," International Conference on Advanced Technology of Design and Manufacture (ATDM 2011), pp. 1-4, (Nov. 2011).

Extended European Search Report and Opinion issued in connection with corresponding EP Application No. 17162634.4 dated Aug. 21, 2017.

*Primary Examiner* — Jessee R Roe

(74) *Attorney, Agent, or Firm* — Dority & Manning, P.A.

(57) ABSTRACT

This disclosure includes the description of a braze alloy composition. The braze composition contains nickel, about 5% by weight to about 25% by weight germanium; and about 1% by weight to about 4% by weight boron. The composition has an amorphous structure, and is free of silicon.

20 Claims, 2 Drawing Sheets

BRAZING COMPOSITIONS FOR DUCTILE BRAZE STRUCTURES, AND RELATED PROCESSES AND DEVICES

TECHNICAL FIELD

This disclosure relates to machines, devices, and other items of manufacture that include metal or ceramic components joined to each other.

BACKGROUND

Equipment of all types is often formed of a combination of diverse materials, such as metals, plastics, and ceramics. Examples include lighting devices; power equipment, e.g., gas turbine engines for land and flight applications; pumps used in oil and gas exploration; spectroscopic devices; and medical equipment, such as X-ray devices. Another example involves electrochemical devices such as batteries and fuel cells. Structures within these devices need to be joined to each other in a way that provides a seal on or within the particular device. Brazing is a widely-used joining method suitable for many of these applications.

The gas turbine engines mentioned above are used in a variety of advanced military and commercial aircraft, as well as power generation plants. The engines often include components that need to be joined together by brazing, e.g., metal-metal joining, metal-ceramic joining, and even ceramic-ceramic-joining. A wide variety of braze compositions have been developed to meet the requirements for many different types of end use applications. As one example, very specialized braze compositions have been developed for joining metal and ceramic components that are used under demanding environmental conditions, including elevated temperatures, e.g., above about 300° C., and sometimes, above about 1,000° C.

Nickel-based braze materials are usually employed for joining nickel-formed components to other components. These materials are often crystalline braze alloys, such as those containing nickel, germanium, and titanium. While such alloys are desirable for many brazing applications, they cannot easily be used and applied in a variety of forms, such as foils, ribbons, and wires. Instead, they often can only be used in the form of powders.

In contrast, braze alloys formed from nickel, boron, and silicon are generally amorphous, and can therefore be used in many forms. These types of alloys are usually characterized as "amorphous glass". While they are preferred for some applications, there are also some drawbacks associated with the alloy compositions. As an example, the presence of the silicon constituent can lead to the formation of one or more brittle intermetallic phases, which are usually undesirable.

As alluded to previously, metal-ceramic joints are often necessary for a variety of these machines and devices. It has often been difficult to provide braze compositions that can successfully provide such a joint, due in part to CTE differences, as well as the difficulty in wetting the ceramic surface during a brazing operation. One technique for achieving a good ceramic-metal uses an active metal element (e.g., titanium or zirconium) that promotes wetting of a ceramic surface, enhancing the capability of providing a hermetic seal. While this technique is useful for many situations, there are other situations where the use of active brazing may not be desirable or cost-effective.

With these concerns in mind, new braze compositions that are generally free from brittle intermetallic phases would be welcome in the industry. The compositions should be relatively ductile, and capable of being formed into a variety of shapes for brazing. The compositions should also exhibit a high level of strength at elevated temperatures that are prevalent for end uses such as gas turbine engines and thermal batteries.

SUMMARY

Embodiments of this invention are directed to a braze alloy composition, comprising:
  a) nickel; or a combination of nickel and cobalt;
  b) about 5% by weight to about 25% by weight germanium; and
  c) about 1% by weight to about 4% by weight boron;
    wherein the composition has an amorphous structure, and is free of silicon.

DETAILED DESCRIPTION

Figure 1:
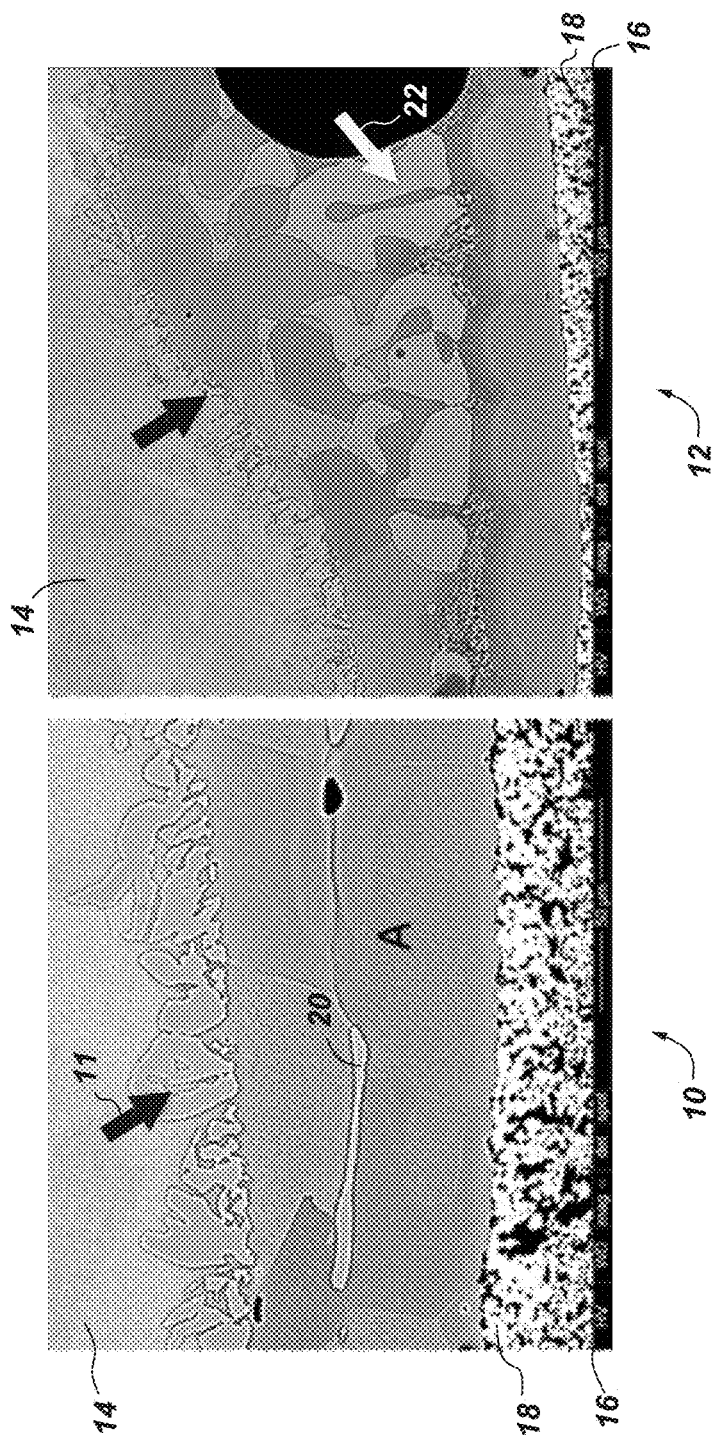
FIG. 1 is a photomicrograph of a braze joint formed with a prior art composition.

Several points should be made regarding the description of various embodiments of the present invention. The articles "a," "an," "the," and "said" are intended to mean that there are one or more of the elements, unless otherwise indicated. The terms "comprising," "including," and "having" are intended to be inclusive, and mean that there may be additional elements other than the listed elements. Moreover, the weights of all constituents are expressed as a percentage of the total weight of the material, e.g., of the braze alloy, unless otherwise specified.

As used herein, the term "and/or" includes any and all combinations of one or more of the associated listed items. Unless otherwise indicated herein, the terms "disposed on", "deposited on" or "disposed between" refer to both direct contact between layers, objects, and the like, or indirect contact, e.g., having intervening layers therebetween.

Approximating language, as used herein throughout the specification and claims, may be applied to modify any quantitative representation that could permissibly vary, without resulting in a change in the basic function to which it may be related. Accordingly, a value modified by a term such as "about" is not limited to the precise value specified. In some instances, the approximating language may correspond to the precision of an instrument for measuring the value.

It may be helpful to provide a brief description of some of the terms used in this disclosure. As used herein, the term "liquidus temperature" generally refers to a temperature at which an alloy is transformed from a solid into a molten or viscous state. The liquidus temperature specifies the maximum temperature at which crystals can co-exist with the melt in thermodynamic equilibrium. Above the liquidus temperature, the alloy is homogeneous, and below the liquidus temperature, an increasing number of crystals begin to form in the melt with time, depending on the particular alloy. Generally, an alloy, at its liquidus temperature, melts and forms a seal between two components to be joined.

The liquidus temperature can be contrasted with a "solidus temperature". The solidus temperature quantifies the point at which a material completely solidifies (crystallizes). The liquidus and solidus temperatures do not necessarily align or overlap. If a gap exists between the liquidus and solidus temperatures, then within that gap, the material consists of solid and liquid phases simultaneously (like a "slurry").

"Sealing" is a function performed by a structure that joins other structures together, to reduce or prevent leakage through the joint between the other structures. The seal structure (e.g., various collar and ring structures as exemplified herein) may also be referred to as a "seal" or "joint" herein, for the sake of simplicity. In the present instance, the ceramic and metal components that can be sealed to each other are sometimes part of at least one thermal battery structure selected from the group consisting of electrode compartments; sealing collar structures, sealing ring structures, and electrical current collectors, as further described below.

Typically, "brazing" uses a braze material (usually an alloy) having a lower liquidus temperature than the melting points of the components (i.e., their materials) to be joined. The braze material is brought slightly above its melting (or liquidus) temperature, while protected by a suitable atmosphere. The braze material flows over the components (known as wetting), and then cools to join the components together.

In most embodiments of the present invention, the braze alloy composition is a nickel-based alloy, or a nickel-cobalt based alloy. In other words, the alloy contains a relatively high amount of nickel or a combination of nickel and cobalt. In the case of a combination of the two metals, the ratio of nickel to cobalt is usually in the range of about 20:1 to about 1:1, by weight.

Most often, the braze alloy composition is nickel-based. Nickel is relatively inert in a corrosive environment (when present), as compared to other known base metals, e.g. copper and iron. Additionally, it is observed that nickel may enhance other properties of the braze alloy, such as the thermal expansion coefficient, and the phase stability. In general, the amount of nickel that is present depends on the amounts of the other constituents. In some embodiments of this invention, a suitable level for the amount of nickel may be at least about 20 weight percent, based on the total weight of the braze alloy. In some embodiments, nickel is present in an amount greater than about 50 weight percent. For selective end-use applications, nickel is often present from about 60 weight percent to about 90 weight percent, and in some specific embodiments, from about 70 weight percent to about 80 weight percent, based on the total weight of the braze alloy.

Germanium is another component of the braze alloy. In the case of nickel-based compositions, the presence of germanium can be important in ensuring the formation of nickel-germanium binary alloys. The binary alloys generally exhibit good strength and ductility, as well as good phase stability at high temperatures.

Germanium can also function as a melting point depressant. Nickel-based alloys may have a liquidus (or melting) temperature that is too high for many end uses. For example, the flow properties of the braze relative to surfaces being joined may be adversely affected due to an excessive liquidus temperature. The present inventors contemplate the addition of germanium in the disclosed types of nickel alloys to effectively lower the liquidus temperature to a desired level.

The amount of germanium present will depend on a number of factors, such as the identity of the base element(s) in the alloy; and the intended end use for the braze material. Usually, germanium is present at about 5% by weight to about 30% by weight of the alloy. In some specific embodiments, germanium is present at about 8% by weight to about 25% by weight of the alloy, and in some cases, about 10% by weight to about 20% by weight. Moreover, in some embodiments, the amount of germanium is about 12% by weight to about 18% by weight. Care is usually taken to ensure that the amount of germanium that is present is not high enough to make the alloy become undesirably brittle.

The braze alloy composition further comprises boron. Boron is essential for enhancing some of the properties of the presently-described nickel-based compositions. As a key illustration, boron can be used to desirably modify the flow properties of the alloys, while also aiding the formation of metallic glass at high rates of cooling or solidification. Boron can also often be used without forming problematic intermetallic brittle phases in the amorphous glasses.

The amount of boron present will depend on a number of factors, such as the type of primary metal in the braze (e.g., nickel alone or in an alloy with cobalt); the required liquidus temperatures and flow properties for the braze material; and the contemplated end use for the material. Usually, the level of boron will be in the range of about 1% by weight to about 4% by weight. In some embodiments, the level is about 1.5% by weight to about 3.5% by weight.

An important aspect of embodiments of this invention is that the braze compositions be free of silicon. Its presence could lead to the formation of hard, brittle intermetallic binary and ternary silicide phases in the braze joint, and at the interfaces between a substrate and the braze material. For applications that require very high braze strengths, and/or involve use at high temperatures (e.g., above about 300° C., and sometimes above about 1000° C.), the presence of the brittle intermetallic silicide phase (or multiple phases) can lower the strength of the braze, and in some cases, can result in joint failure. As used herein, "free of silicon" is meant to indicate that, at most, impurity levels of the element may be present, e.g., less than about 0.01% by weight.

In other instances, the compositions of the present invention should be substantially free of certain other elements as well (again, 0.01% by weight or less for each). They include at least one of copper, manganese, silver, gold, platinum, palladium, gallium, tin, antimony, beryllium, strontium, and lead. While such elements may sometimes be desirable and even required in some braze compositions, their presence for most end uses (although not all end uses) contemplated herein can have an adverse effect.

As an example, for embodiments related to sodium-based thermal batteries (e.g., sodium nickel halide batteries), some embodiments require the exclusion of silver, palladium, platinum and gold. Other embodiments require the exclusion of silver, gold, gallium, tin, and lead. Moreover, other embodiments for the sodium-based batteries require the exclusion of copper, and especially the exclusion of pure copper metal, due to possible, undesirable reactions with halides in the cathode of the battery.

In certain important embodiments, the braze composition is free of active metals. These typically include titanium, zirconium, hafnium, and vanadium. While active metals are desirable in other types of brazing systems, their presence is not necessary here because active brazing is not being undertaken to join the components. Moreover, the presence of active metals can sometimes be disadvantageous. For example, titanium, in the presence of constituents like germanium and boron, can at least be partially transformed into very stable, brittle phases that can lower the integrity of the braze joint.

Some embodiments of the present invention also include chromium, which can be an important constituent. Chromium plays a key role in environmental resistance, e.g., resistance to "hot corrosion", mixed-gas attack, and mechanical damage, like erosion. Chromium can also be important for enhancing the high temperature strength of the braze, and its inherent oxidation resistance.

The amount of chromium (when present) is based on a number of factors, including the environment in which the braze material will be employed, as well as the relative amounts of nickel, cobalt and refractory element(s) that are present. (The last-mentioned elements are discussed below). Usually, the level of chromium is about 1% to about 40% (and sometimes, about 10%-30%), based on the weight of the braze composition. In some other specific embodiments, the level is in the range of about 5% to about 17% by weight. In some embodiments—especially when joining components within a sodium-metal halide thermal battery, the level of chromium is in the range of about 6% to about 12%. Moreover, in some embodiments, iron may be present, usually at about 1% by weight to about 7% by weight. It should also be noted that for some embodiments, aluminum is not present, or is present only as an impurity, in trace amounts.

In other embodiments, at least one refractory metal is present in the braze composition. Examples are niobium, molybdenum, tungsten, tantalum, or various combinations thereof. The refractory element is especially useful for providing strength and high-temperature resistance for the braze. A refractory element like niobium can also provide good corrosion-resistance in a sodium-containing environment, e.g., for sodium-based thermal batteries. In some instances, the refractory element is niobium, or a combination of niobium and tantalum.

The level of the refractory element (when present) will depend on a number of factors, most of which are set forth above. Usually, the braze alloy will contain about 1% by weight to about 10% by weight (total) of the refractory element, and sometimes, about 1-7% by weight. Greater amounts of refractory elements like niobium can in some cases result in the formation of brittle intermetallic phases, which are undesirable, as described previously.

The braze alloy composition of the embodiments of the invention is often characterized by one of several microstructures. In some embodiments, the microstructure is entirely a single gamma-nickel phase, with at least germanium in solution, at up to 12 percent by weight. In other embodiments, the microstructure comprises a two-phase microstructure, i.e., gamma-nickel and a gamma prime (gamma') $Ni_3Ge$ precipitate. The $Ni_3Ge$ precipitate is found at levels between about 1% by volume and 75% by volume, and In some embodiments, between about 30% by volume and 60% by volume. The precipitate has a linear size between about 0.1 micron and 5 microns, in some embodiment, within a range between about 0.4 micron and 1 micron. In still other embodiments, the microstructure comprises borides of nickel, chromium, and other metal refractory elements, such as those described previously. The metal boride phases would comprise about 1% to 35% of the volume fraction of the overall material.

The braze compositions of the embodiments of the invention can be used for a variety of applications. For example, they can be used to join metal components to ceramic components that have been metallized, for a variety of structural, electrical, and packaging applications. They are also very useful for joining a metallized ceramic component to another metallized ceramic component.

The metal component can be formed of a variety of materials. Non-limiting examples include nickel, cobalt, niobium, molybdenum, tungsten, iron, nickel-cobalt ferrous alloys (e.g., Kovar® alloys), mild steel, stainless steel, and various alloys of any of the foregoing.

Many different ceramic materials can be used for embodiments of this invention. Non-limiting examples include zirconia and zirconia-based materials (e.g., yttria-stabilized zirconia), alumina (e.g., alpha alumina), aluminum nitride, silicon carbide, porcelain, titanium carbide, silica (e.g., glass), ceramic matrix composites (CMC's), magnesium aluminate spinel, magnesium oxide, and silicon nitride, as well as many alloys of such materials. The ceramic can also be a "MAX" phase material of the formula $M_{n+1}AX_n$, where n is 1-3, M is an early transition metal, e.g., scandium, titanium, vanadium, zirconium, niobium, molybdenum, hafnium, or tantalum; A is cadmium, aluminum, indium, thallium, silicon, germanium, tin, lead, phosphorus, arsenic, or sulfur; and X is carbon or nitrogen. An example of such a material is $Ti_3SiC_2$. The ceramic component can also be formed of an ultra high temperature ceramic (UHTC), such as the $MX_y$ family of materials, where M is a transitional metal, and X can be carbon, boron, or nitrogen. They can include both monolithic UHTC or CMCs or MMCs (Metal Matrix composites).

The ceramic component is metallized in order to ensure proper brazing to the second component. A number of metallization techniques can be used, and some of them are described in various references, e.g., U.S. Patent Publication 2014/0295258 (S. Kumar et al); and "Comparing Metal-Ceramic Brazing Methods", Brazing & Soldering Today; Welding Journal 43; International Brazing & Soldering Symposium, FABTECH International & AWS Welding Show, Nov. 11, 2007. Both of these documents are incorporated herein by reference. Non-limiting examples of metallization methods include a molybdenum-manganese/nickel plating technique; and a physical vapor deposition technique.

As also alluded to previously, various structures in electrochemical devices can be successfully joined with the braze compositions of the embodiments of the invention. One example is a thermal battery, e.g., a sodium-based rechargeable battery that typically operates at temperatures above about 250° C. Structures within such batteries often involve metal-metal attachments or ceramic-metal attachments that include electrode compartments; sealing collar structures, sealing ring structures, and electrical current collectors. These types of batteries are set forth in a variety of references, such as U.S. Patent Publication 2013/0316226 (R. Adharapurapu et al), published on Nov. 28, 2013, which is incorporated herein by reference. As mentioned above, ceramic structures would be metallized prior to attachment to other structures by way of the braze material.

The braze alloys described herein; and the braze seal formed thereof, generally have good stability and chemical resistance within determined parameters at a determined temperature. It is desirable (and in some cases, critical) that the braze seal retains its integrity and properties during several processing steps while manufacturing and using the cell, for example, during a glass-seal process for a ceramic-to-ceramic joint, and during operation of the cell. In some instances, optimum performance of the cell is generally obtained at a temperature greater than about 300° C. In one embodiment, the operating temperature may be in a range from about 270° C. to about 450° C. In some embodiments, the glass-seal process is carried out at a temperature of at least about 1000° C.

Ceramic and/or metal components that need to be joined together are present in a large number of instruments, machines, structures, and devices. Non-limiting examples include lighting devices, automobile parts; and frame-sections and other structures within buildings, e.g., heating and ventilation systems. Other examples include power equipment, e.g., gas turbine engines; as well as pumps, motors, compressors, and spectroscopic equipment used in oil and gas exploration, e.g., drilling operations. Medical equipment may include various ceramic and metal structures that also need to be joined with a relatively high degree of joint integrity. An exemplary medical device of this type is an X-ray device.

Additional embodiments of this invention are directed to methods for joining a first component to a second component by using a braze alloy composition. The method includes the steps of introducing the braze alloy between the first component and the second component to form a brazing structure. The alloy could be deposited on one or both of the mating surfaces. Due in part to its amorphous structure, the braze alloy can readily be formed into a foil, a sheet, a ribbon, a preform, or a wire. The alloy can also be formulated into a paste containing water and/or organic fluids, mixed with braze alloy powder. If at least one of the components is a ceramic material like alumina, the component is metallized by one of the techniques described previously.

After being applied to one of the mating surfaces, the braze material can then be heated to form the braze seal. The brazing temperature and the brazing time may influence the quality of the braze seal. The brazing temperature is generally less than the melting temperatures of the components to be joined, and higher than the liquidus temperature of the braze alloy. Very often, the melting point of the braze alloy is between about 1000° C. and 1350° C., and in some cases, between about 1050° C. and 1250° C. In one embodiment for many of the end uses described herein, the melting point is between about 1100° C. and 1250° C. The braze joint re-melt temperature can be at least 100° C.-200° C. higher than the braze alloy melting temperature. In one embodiment, the brazing temperature ranges from about 1000° C. to about 1350° C., for a time period of about 1 minute to about 60 minutes. Other details regarding the braze process are set forth in a number of references, including U.S. Patent Application 2013/0315659 A1, S. Kumar et al, published on Nov. 28, 2013, and incorporated herein by reference.

EXAMPLES

The examples that follow are merely illustrative, and should not be construed to be any sort of limitation on the scope of the embodiments of the invention. Unless specified otherwise, all ingredients may be commercially available from such common chemical suppliers as Alpha Aesar, Inc. (Ward Hill, Mass.), Sigma Aldrich (St. Louis, Mo.), Spectrum Chemical Mfg. Corp. (Gardena, Calif.), and the like.

Two braze alloy compositions were prepared, Samples 1 and 2. Sample 1 represented a prior art braze, while sample 2 represented a braze composition according to embodiments of the present invention. For each braze sample, as shown in Table 1, individual elements were weighed according to the desired composition. These elements were arc-melted to provide an ingot for each composition. The liquidus temperatures of the two samples were measured using Differential Scanning calorimeter (DSC).

TABLE 1

| Braze Samples | Braze alloy composition (weight percent) | Liquidus temperature |
|---|---|---|
| Sample 1 | Ni—7Cr—4.5Fe—4.5Si—3.2B | 1055° C. |
| Sample 2 | Ni—3.12B—9.8Ge—8Cr | 1060° C. |

Each ingot of samples 1 and 2 was melt-spun and rapidly quenched into approximately a 75 micron-thick amorphous, ductile sheet. These sheets were measured for elemental analysis by Electron probe micro-analysis (EPMA).

Each sheet of braze material was separately placed between the surfaces of a metallized alpha alumina part and a nickel part, to be joined together. This assembly was then heated up to about 1200° C. for about 10 minutes, and then cooled to room temperature, to form a joint.

FIG. 1 shows cross-sectional SEM images of different sections 10, 12 of a braze joint, formed from a prior art, silicon-containing composition (sample 1). Region 14 is a nickel-based component being joined to ceramic (alumina-based) component 16 that has been molybdenum-metallized. (See metallization region 18). The region designated by "A" in section 10, is the joint area. (Arrow 11 points generally to the interdiffused zone between metal layer 14 and the braze material).

With continued reference to FIG. 1, the region in section 10, generally shown as line 20, is considered to be the center-line eutectic. The presence of the brittle center-line eutectic compound is an indication of joint weakness, e.g., a location where the joint can potentially crack and fail, under thermal stress or other demanding conditions. With regard to section 12, the arrow 22 points to a portion of the brittle silicon-based intermetallic phase in this braze joint. As described previously, the substantial presence of this phase is greatly responsible for a potential decrease in the ductility of the braze joint.

Figure 2:
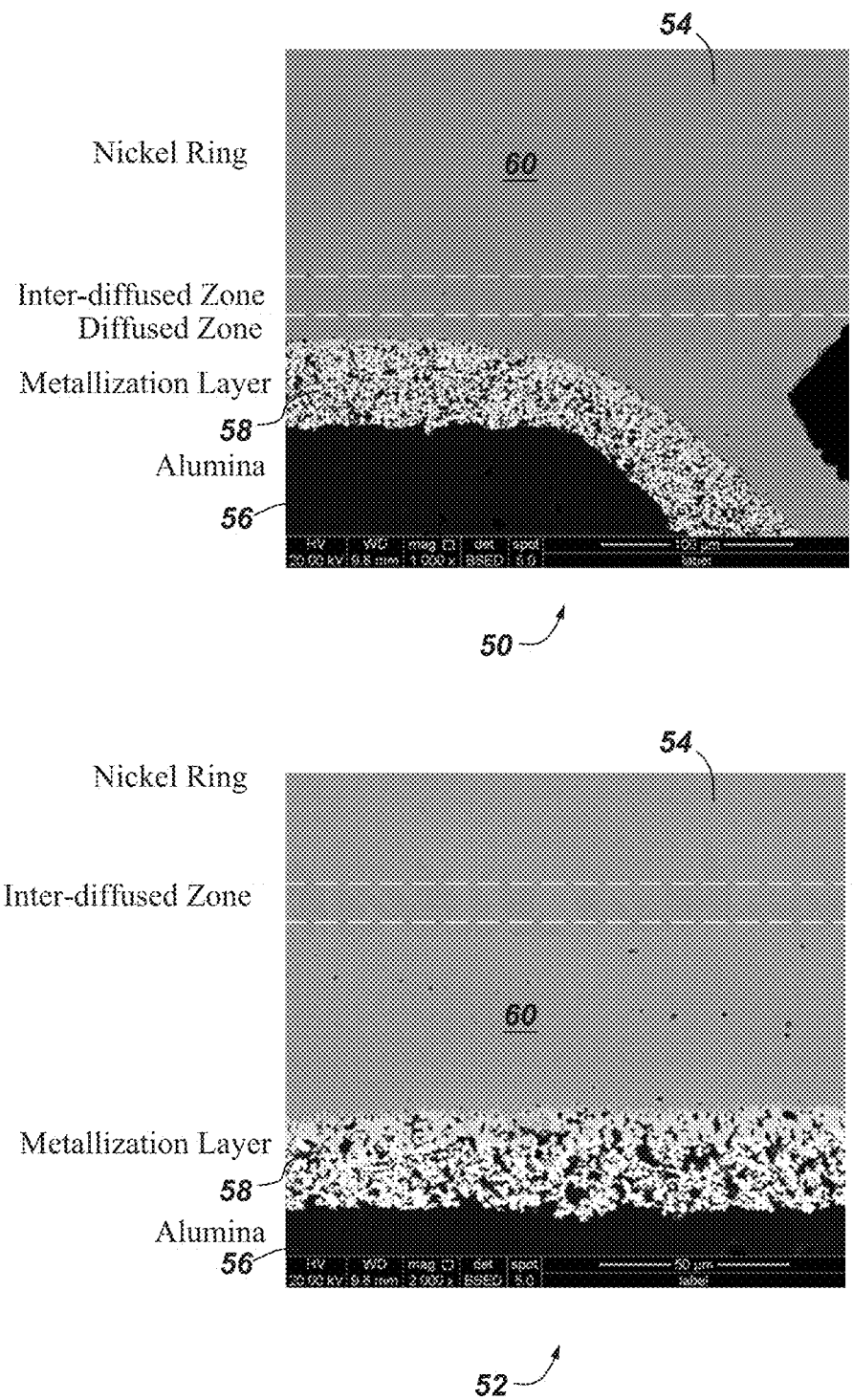
FIG. 2 is a photomicrograph of a braze joint formed with a composition that is based on embodiments of the present invention.

FIG. 2 shows cross-sectional SEM images of different sections 50, 52 of a braze joint, formed from the braze alloy composition based on embodiments of this invention (sample 2). The general arrangement of the brazed structure is similar to that of FIG. 1. (The visible boundaries between the different sections of the overall structure are faint in some instances, so the boundary lines are approximate). Region 54 is the nickel-based component, i.e., a nickel ring that is part of the sealing structure for a thermal battery. The ring is joined to a ceramic-based component 56 (e.g., a ceramic collar for the battery) that has been metallized, as in the case of sample 1. (See metallization region 58).

In contrast to the braze alloy formed of the composition of sample 1, joint area 60 is generally free of any brittle, centerline eutectic intermetallic phases. Moreover, the joint exhibits "clean", uniform interfaces with both the nickel ring and the metallized ceramic component. It is expected that the joint will be more ductile, stronger and exhibit a longer life, as compared to the braze joint of sample 1. Nickel-based braze alloys of this type, being free of silicon and also capable of brazing ceramics below about 1100° C., are projected to be strong additions to brazing technology in a number of end use applications, as set forth above.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed:

1. A braze alloy composition, comprising:
a combination of nickel and cobalt;
5% by weight to 25% by weight germanium; and
1% by weight to 4% by weight boron;
   wherein the composition has an amorphous structure, and is free of silicon.

2. The braze alloy composition of claim 1, further comprising chromium, at a level of 1% by weight to 40% by weight.

3. The braze alloy composition of claim 1, having a composition free of active metals.

4. The braze alloy composition of claim 1, free of palladium, gold, and aluminum.

5. The braze alloy composition of claim 1, comprising at least 20% by weight nickel.

6. The braze alloy composition of claim 5, comprising 60% to 90% by weight nickel.

7. The braze alloy composition of claim 1, wherein the level of germanium is 10% by weight to 18% by weight.

8. The braze alloy composition of claim 1, wherein the level of boron is 1.5% by weight to 3.5% by weight.

9. The braze alloy composition of claim 1, further comprising at least one refractory element selected from molybdenum, tungsten, tantalum, and niobium.

10. The braze alloy composition of claim 9, containing 1% by weight to 10% by weight (total) of the refractory elements.

11. A braze joint formed of the composition of claim 1, having a microstructure that comprises a gamma nickel phase and a gamma prime (gamma') $Ni_3Ge$ phase, wherein the $Ni_3Ge$ component is a precipitate present at levels between 1% by volume and 75% by volume.

12. A braze joint formed of the composition of claim 1, joining a metallized ceramic component to a metal component.

13. The braze joint of claim 12, wherein the metal for the metal component comprises nickel, cobalt, molybdenum, tungsten, iron, nickel-cobalt ferrous alloys, mild steel, stainless steel, and various alloys of any of the foregoing.

14. The braze joint of claim 13, wherein the ceramic and metal components are structures joined together in a medical device.

15. The braze joint of claim 12, wherein the ceramic and metal components structures joined together in a turbine engine.

16. The braze joint of claim 12, wherein the ceramic and metal components are structures joined together in a drilling, pumping or motor device for oil or gas exploration, or in a spectroscopic device.

17. The braze joint of claim 12, wherein the ceramic and metal components each comprise at least one thermal battery structure selected from the group consisting of electrode compartments; sealing collar structures, sealing ring structures, and electrical current collectors.

18. The braze joint of claim 17, wherein the thermal battery structure is a portion of a sodium-based thermal battery.

19. A braze joint formed of the composition of claim 1, joining a metallized ceramic component to at least one other metallized ceramic component.

20. A braze joint of claim 19, wherein each ceramic component independent comprises zirconia or a zirconia-based material; alumina; aluminum nitride, silicon carbide, porcelain, titanium carbide, silica, glass, ceramic matrix composites (CMC's), magnesium aluminate spinel, magnesium oxide, silicon nitride, an "MAX" phase material of the formula $M_{n+1}AX_n$, where N is 1-3, M is an early transition metal, A is a group A element, and X is carbon or nitrogen; ceramic of the formula $MX_y$, wherein M is a transitional metal; and X is carbon, boron, or nitrogen alpha-alumina structure; and alloys of any of the foregoing.

* * * * *